United States Patent [19]
Amoroso et al.

[11] Patent Number: 5,163,080
[45] Date of Patent: Nov. 10, 1992

[54] VOICE MESSAGING

[75] Inventors: Michael D. Amoroso, San Jose; Bruce A. Prentice, Los Gatos, both of Calif.

[73] Assignee: Amvox, Inc., Los Gatos, Calif.

[21] Appl. No.: 314,536

[22] Filed: Feb. 22, 1989

[51] Int. Cl.$^5$ .................... H04M 3/10; H04M 3/50
[52] U.S. Cl. ........................ 379/33; 379/84; 379/89; 379/207; 379/214
[58] Field of Search .............. 379/67, 88, 89, 211, 379/212, 213, 214, 210, 84, 207, 32, 33

[56] References Cited

U.S. PATENT DOCUMENTS

| | | | |
|---|---|---|---|
| 4,221,933 | 9/1980 | Cornell et al. | 379/84 |
| 4,578,540 | 3/1986 | Borg et al. | 379/40 |
| 4,659,877 | 4/1987 | Dorsey et al. | 379/88 |
| 4,878,240 | 10/1989 | Lin et al. | 379/67 |
| 4,935,954 | 6/1990 | Thompson et al. | 379/89 |

FOREIGN PATENT DOCUMENTS 0095763  6/1984  Japan ...................... 379/67

OTHER PUBLICATIONS

Bell Communications Research, "Interface Between Customer Premise Equipment; Simplified Message Desk and Switching System: 1AESS," *Technical Reference TR-TSY-000283*, Issue 1, Jul. 1985.

"Octel Can Integrate Up to 7 CO Switches With One Voice Processing System," Feb. 1989.
"Octel Communications Pioneers Integration of Seven Central Office Switches With One Voice Processing System," Mar. 7, 1989.
Signetics, "TTL Logic Data Manual 1982," pp. 3–13 and 3–97.
"DVX--an alternative to the post ofice", E. M. Byrue, *Telephony*, Apr. 5, 1982, pp. 46, 47.
"Integrating a voice store and forward system in an OCC network", R. Jaluria et al., *Telephony*, Apr. 5, 1982, pp. 30–32 and 37.
"Conversant 1 voice system: architecture and applications", R. J. Perdue et al., *AT&T Technical Journal*, vol. 65, No. 5, Sep./Oct. 1986, pp. 34–47.
Telescan Corp. ad, *Teleconnect*, May 1988, p. 147.
"The Mezza System", R. E. Walters et al., *Brit. Telecomin. Engurg.*, vol. 7, Oct. 1988, pp. 162–171.

*Primary Examiner*—Thomas W. Brown
*Attorney, Agent, or Firm*—Townsend and Townsend

[57] ABSTRACT

A method and apparatus for providing voice messaging services from a plurality of central office facilities is disclosed. Customer voice messaging computers are provided access to the central office facilities via an adjunct SMDI processor. The processor preferably includes an appropriately programmed AT-compatible computer and board.

11 Claims, 18 Drawing Sheets

Microfiche Appendix Included
(46 Microfiche, 1 Pages)

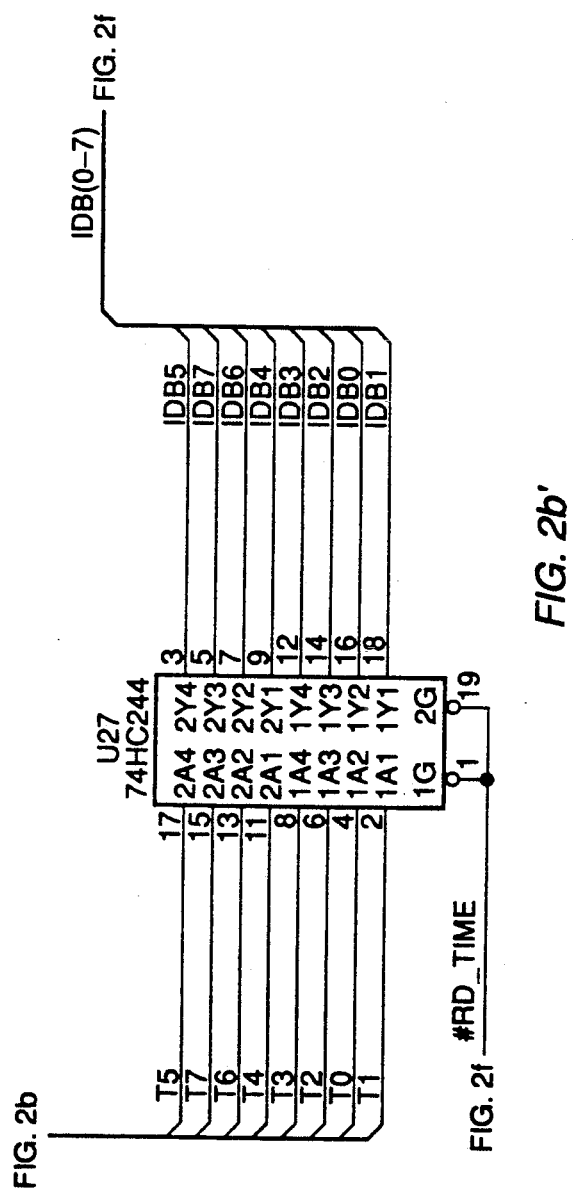

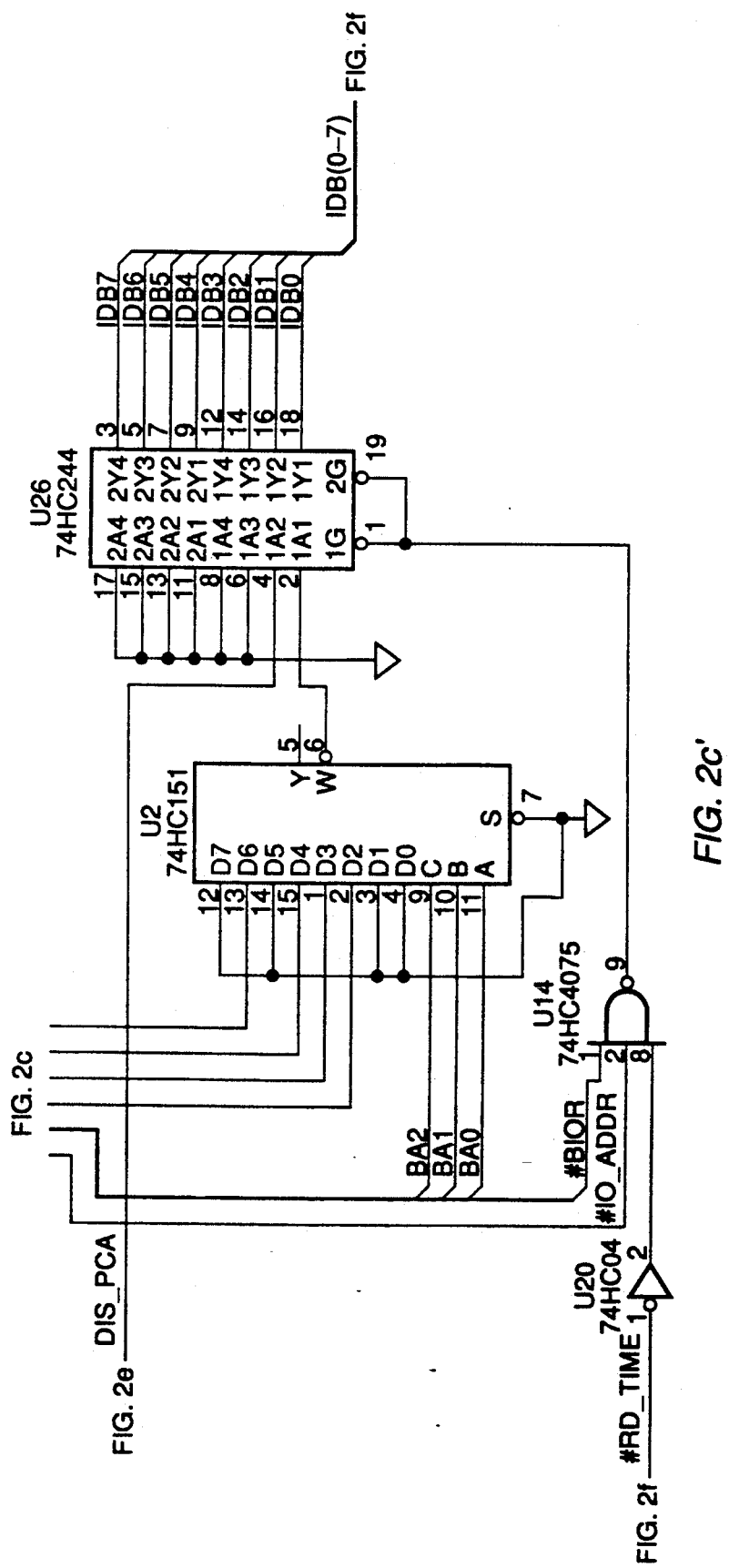

FIG. 2d'

VOICE MESSAGING

MICROFICHE APPENDIX

This specification includes microfiche Appendix I having one sheet with 46 frames.

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office files or records, but otherwise reserves all rights whatsoever.

BACKGROUND OF THE INVENTION

1. Field of the Invention

The present invention is related to the field of telecommunication systems. In particular, the present invention provides an improved voice messaging system especially for use with multiple telephone company central office facilities.

2. Description of Related Art

Simplified message desk interface (SMDI) systems are well known in the art of telecommunications. Such SMDI systems provide users with a variety of services such as voice messaging, call forwarding, message notification, and the like. Such SMDI technology is available from American Telephone & Telegraph and Northern Telecom Inc. as a part of model nos. DMS100, 5ESS, and 1AESS.

Problems arise in the use of such SMDI services, especially in urban areas where there are a variety of telephone central office switching locations. In such urban areas, a user of several central offices must obtain a separate link from each central office from which information or message waiting activation is desired because SMDI capability is presently strictly intra-office by technology limitations of the central office equipment.

It has been proposed to use a Signalling System 7 to provide sophisticated voice processing services. The implementation of this intelligent network is extremely complicated and will require a huge investment. Therefore it will be many years before the intelligent network becomes commonly available in the public telephone network. Furthermore, Signalling System 7 has not incorporated many services such as interoffice stutter dial tone activation.

It is desirable, therefore, to provide a method and apparatus for fully integrated calling- and called-party identification and message waiting notification services, as well as a method and apparatus for activation of message waiting and notification using available asynchronous SMDI data links in which a user need obtain only a single link to an outside provider.

SUMMARY OF THE INVENTION

An improved voice messaging method and apparatus is disclosed. The method and apparatus find particular use in areas where multiple phone service switching entities are located in close geographic proximity. Multiple central office facilities are linked to a central voice mail service bureau. The central voice mail service bureau is provided with an appropriately programmed digital computer of the type known to those of skill in the art along with an auxiliary board, which enables a large number of users to utilize the services of all of the central office telephone service providers. Each of the users is required to have only a single link to the voice mail service bureau.

The invention disclosed herein provides several new capabilities. For example, up to 32 SMDI data links can be terminated on a single voice messaging system regardless of the voice messaging system's SMDI capacity. This results in a major reduction in investment and provides a practical and cost-effective solution to the previously prohibitive cost of the hardware necessary to connect to multiple telephone office switching facilities. Further, incoming calls on an SMDI line group can be answered by any one of a variety of mailbox numbers, regardless of the identified calling or forwarded number. This means that one mailbox can answer multiple telephones at multiple locations (e.g., those at the home and in the office). Further, traditional "DID" mailboxes can now activate stutter dial tone and permit flexible numbering plans for a mailbox service. Still further, any group of valid directory numbers can be alerted by a stutter dial tone message from any mailbox number.

In a preferred embodiment, an incoming call can be answered by different mailboxes depending on the reason the call reached the voice messaging system. For example, if the call reached the voice messaging system because of a "line busy" signal, the message may be put into a different mailbox than if the call entered the system because of a "call forward" signal. Moreover, an unlimited number of valid directory numbers can have a stuttered dial tone activated from a single mailbox. For example, if a group such as a volunteer fire department is connected to the voice messaging system each of the members of the group can be alerted to the presence of a message in a single mailbox.

A data line integrity and data monitoring system is also disclosed. The data integrity and data line monitoring system runs continuously so as to guarantee proper operation of the SMDI links, in contrast to current systems which do not sufficiently monitor the operation of attached SMDI links. The system disclosed herein immediately flags service personnel of irregularities in the event of the loss of a link or the lack of data integrity.

BRIEF DESCRIPTION OF THE DRAWINGS

FIGS 2a and 2a' respectively illustrate a time base generator and 12-volt power monitoring circuitry;

FIGS. 2b and 2b' illustrate a timer "watch-dog" circuit;

FIGS. 2c and 2c' illustrate an alarm control circuit;

FIGS. 2d and 2d' illustrates an alarm circuit;

FIG. 2e illustrates a reset logic circuit;

FIGS. 2f and 2f' illustrate an input/output interface;

FIG. 2g illustrates the input/output channels of the input/output interface;

FIG. 2h illustrates a circuit set of bypass capacitors;

FIG. 2i illustrates a circuit set of spare gates; and

FIG. 2j illustrates a speaker circuit.

DETAIL DESCRIPTION OF THE PREFERRED EMBODIMENTS

General

Figure 1:
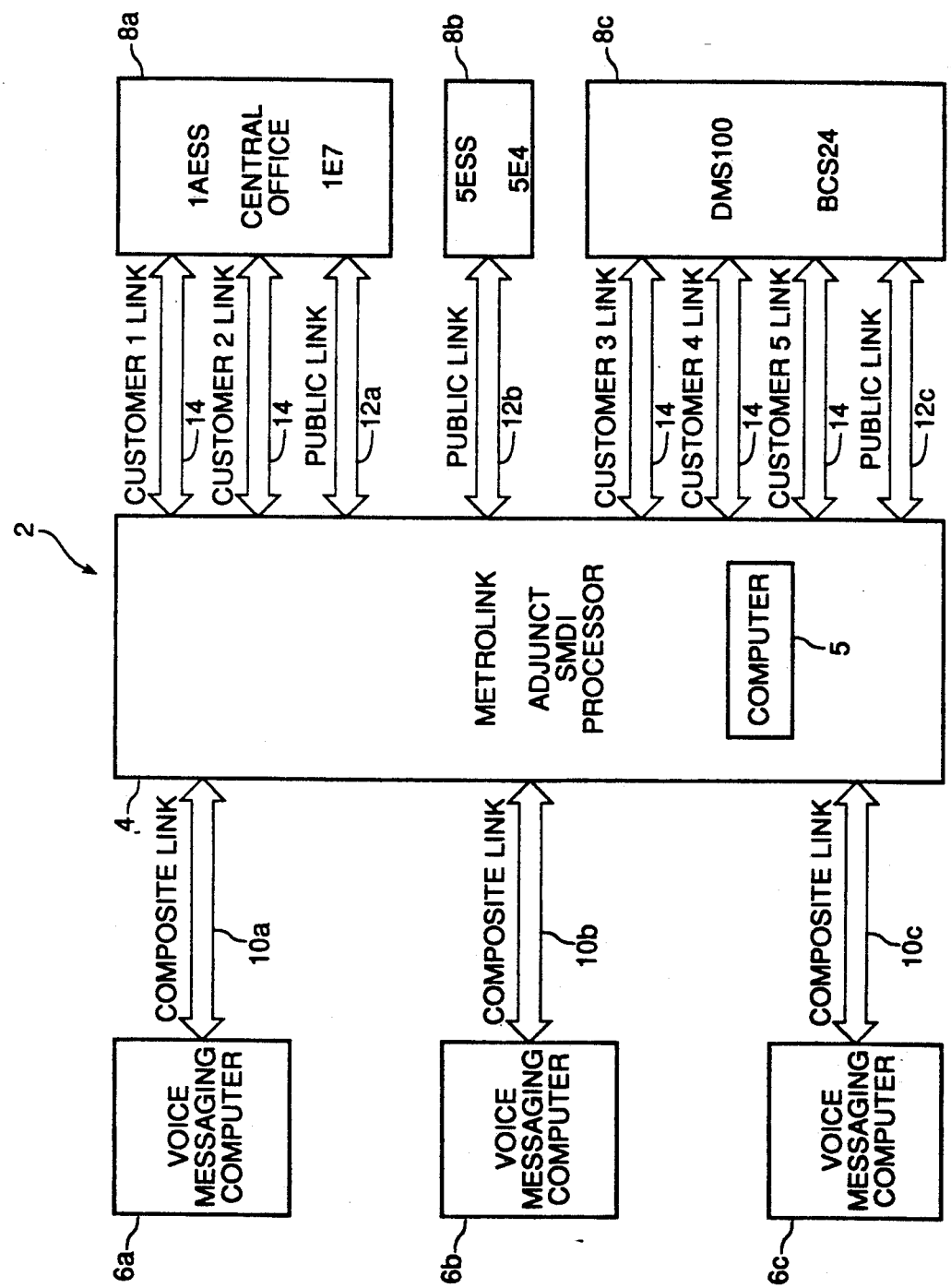
FIG. 1 provides an overview of the voice messaging system disclosed herein.

FIG. 1 provides an overview of the Simplified Message Desk Interface (SMDI) system 2 disclosed herein. The SMDI system includes an adjunct SMDI processor 4 which is used as an interface between voice messaging computers 6a, 6b, and 6c and telephone company central office facilities 8a, 8b, and 8c. Adjunct SMDI processor 4 is referred to elsewhere herein as the "MetroLink SM" system.

Central office facilities 8a, 8b, and 8c may, for example, include 1AESS TM Generic 7 equipment 8a (manufactured by American Telephone and Telegraph Company, AT&T), 5ESS TM Generic 4 equipment 8b (also manufactured by AT&T), and/or DMS100 TM Generic BCS26 equipment 8c (manufactured by Northern Telecom, Inc). It will of course be apparent to those of skill in the art that the above listed devices are merely exemplary of the devices which may be used herein. MetroLink system 4 is connected to telephone central office facilities 8a, 8b, and 8c via public links 12a, 12b, and 12c, such as a 4 line data link extended via a 3002 private wire line facility. Customer links 14 may optionally be provided and would be dedicated lines for an individual customer.

Voice messaging computers 6a, 6b, and 6c are connected to the adjunct SMDI processor 4 via composite links 10a, 10b, and 10c. Voice messaging computers 6a-c may, for example, be an Octel Aspen system or other similar system. Composite links 10a, 10b, and 10c are of the type known to those of skill in the art and may, for example, be standard SMDI links.

The SMDI adjunct processor includes a digital computer 5 of the type readily known to those of skill in the art. An IBM AT or AT-compatible computer may, for example, be utilized, although it will be readily apparent to those of skill in the art that a wide variety of digital computers could be utilized without departing from the spirit of the invention herein. The AT computer is provided with a PC card and appropriate software for performing the above-described functions. An RS232 link such as an ARNET TM SMARTPORT TM (not shown) may serve as an interface between processor 4 and customer/public links 14 and 12.

In operation, a service provider with a MetroLink system 4 subscribes to customer links 14 and public links 12a, 12b, and 12c, which are generally provided by a telephone company. Customers are associated with voice messaging computers 6a, 6b, and 6c and may forward calls to an SMDI pilot number when they desire their calls to be answered by the service provider. Calls may also be forwarded to the service provider when the customer's line is busy, or when it is not answered after a preset number of rings. The service provider may activate a stuttered dial tone on the line of the customer to indicate that a message is waiting. MetroLink system 4 provides economies for customers by connecting several SMDI telephone services (even those in different cities) to a single service provider.

Continuous monitoring of the system 2 is also provided. If an error condition is detected, the "symptoms" are analyzed and a recovery attempt is made. If recovery is not possible, an appropriate alarm is set. In either event, an entry is made in a system log file for future analysis.

When data are presented to a serial port interface of the MetroLink processor the data are analyzed and checked for correct format and content. If the data are incorrect, an alarm is set and the entry is made into the system log file. In addition, the SMDI data links are continuously analyzed for loss of a carrier. Should a carrier be lost, the system major alarm is set and a log file entry is made.

Translation tables are used by the MetroLink system and maintained in RAM to facilitate the fastest possible access. Consequently, the tables are susceptible to system power failure. To ensure that translation tables are correct, they are continuously checksummed. If an error occurs, the tables are reloaded, a log file entry is made, and an alarm is set.

A hardware watchdog timer is also provided and is enabled upon system power-up. If the watchdog timer is not "tickled" by the system software on an ongoing basis, the watchdog timer hardware will force a system reset. The watchdog timer cannot be disabled by the system software, giving an added measure of security and reliability to the system.

System Software

Mircofiche Appendix I provides the software utilized herein.

Figure 3A:
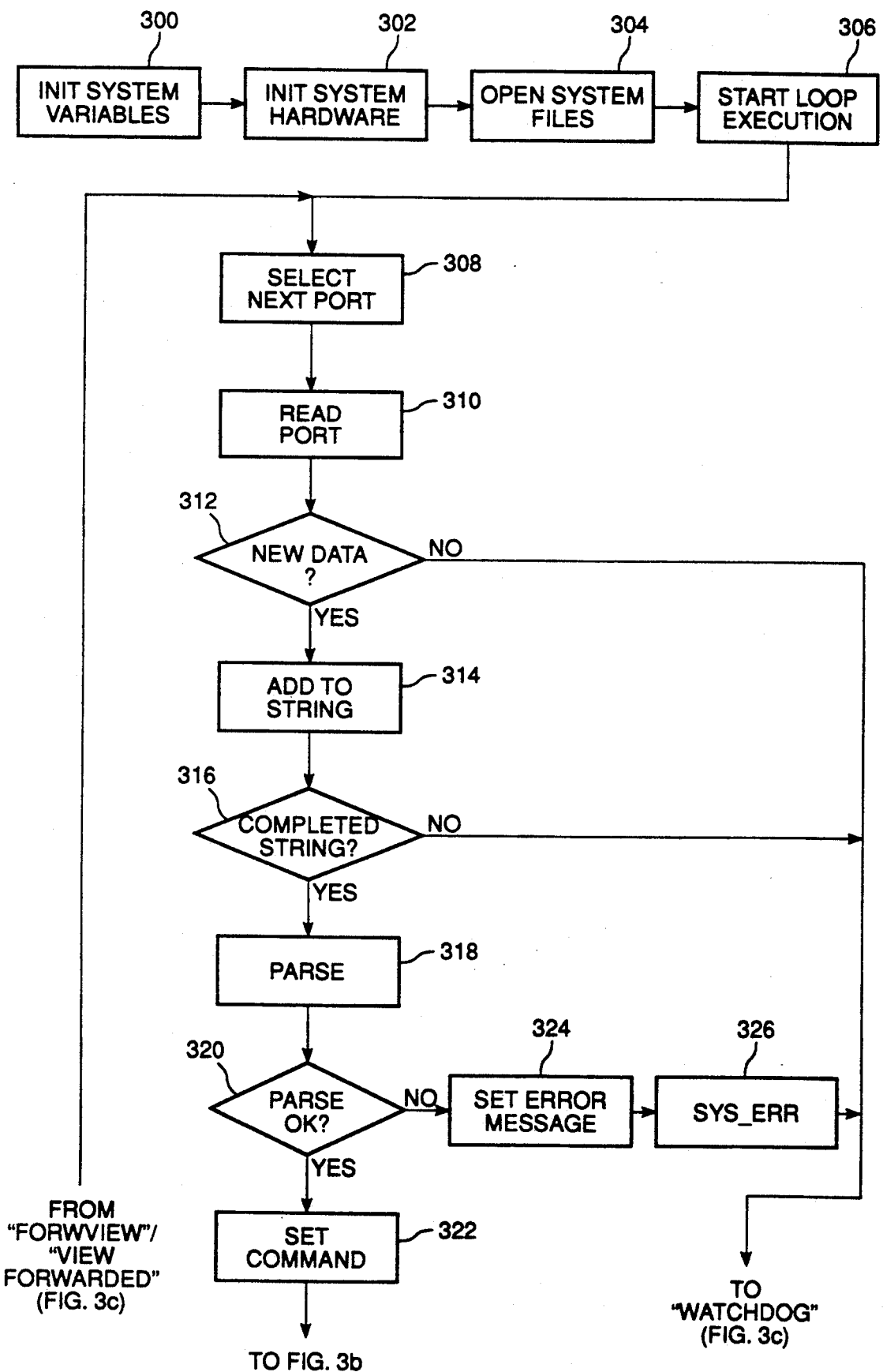
FIGS. 3a, 3b, 3b' and 3c are flowcharts illustrating the steps followed in the system.

In FIG. 3a, the system begins by initializing the variables (step 300), hardware (step 302), opening files (step 304), and then executes a loop as follows (step 306). The loop starts by selecting a next port (step 308), reading the selected port (step 310), and then seeking new data (step 312). If there is no new data on the selected port, the loop proceeds to a "watchdog" routine as shown in FIG. 3c. If there is new data, the loop proceeds to add to a data string (step 314).

If the string is not completed (step 316), the loop jumps to the watchdog routine. If the string is completed, the loop then jumps to a parse routine (step 318) and disassembles the string into its basic components. Next, the loop asks whether the parse is acceptable (step 320). If it is, the loop sets the next command (step 322), if not, the loop set an error message (step 324), which signals a system error (step 326) before jumping to the watchdog routine.

Figure 3B:
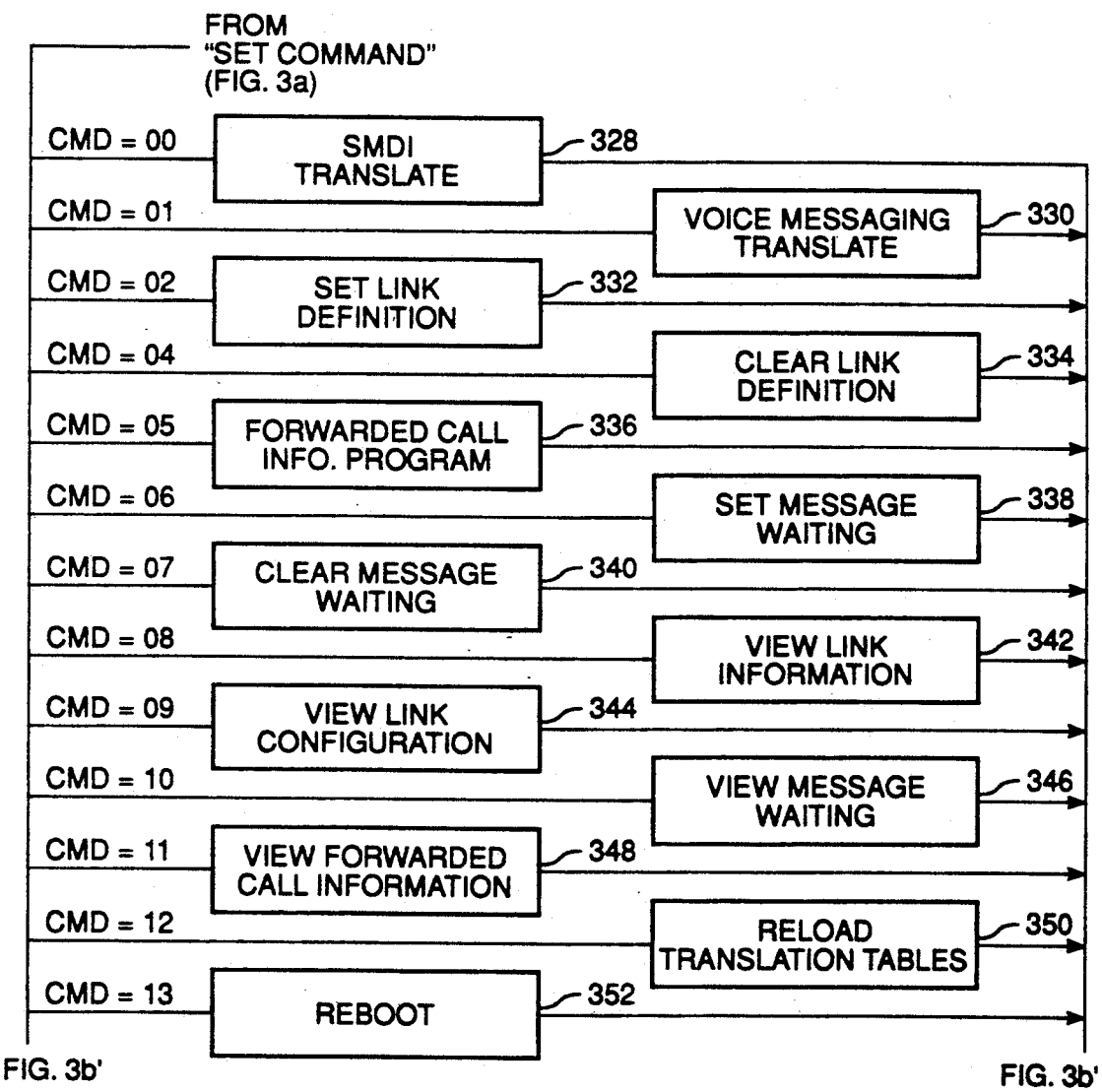
Figure 3B:
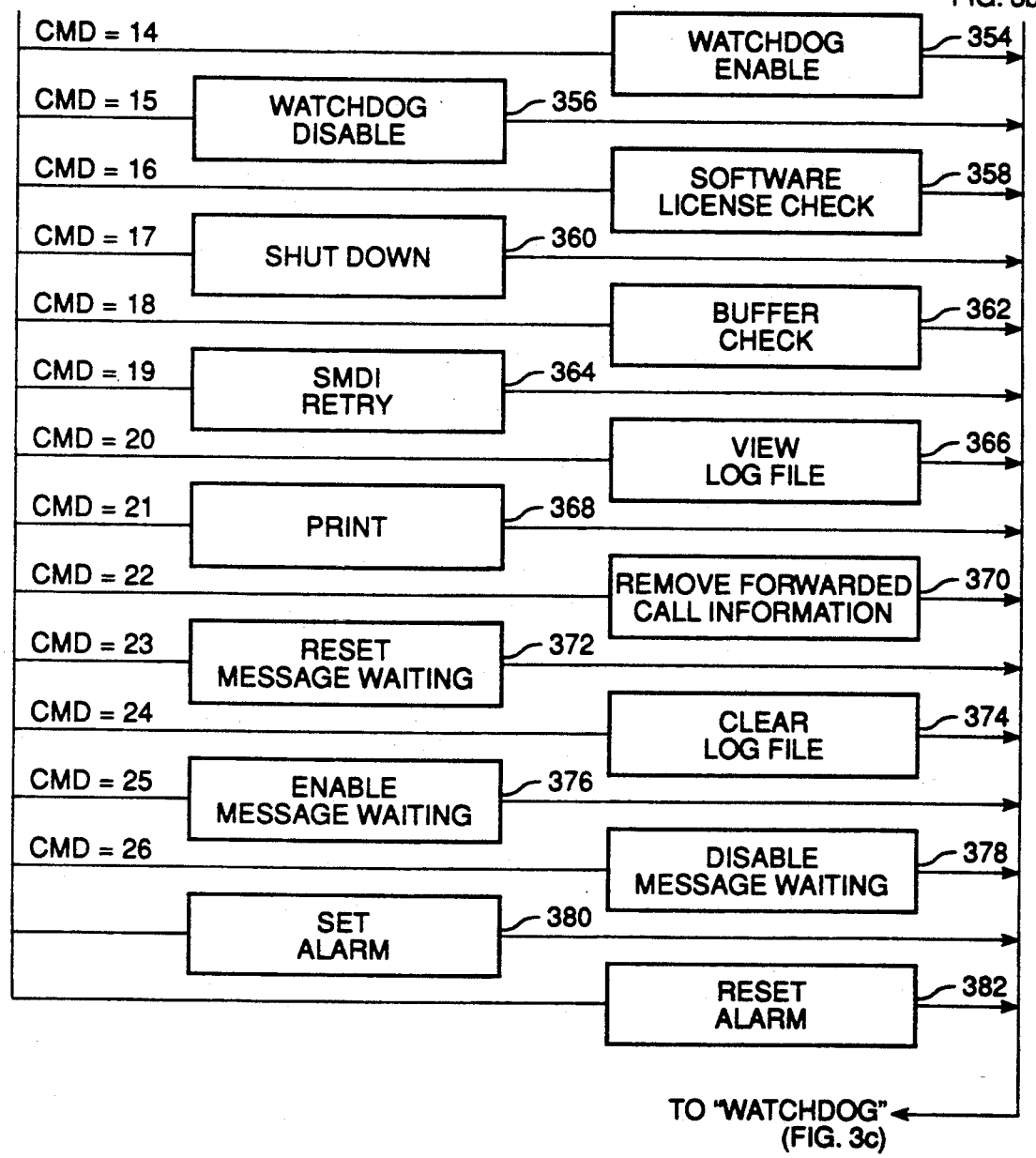
Figure 3C:
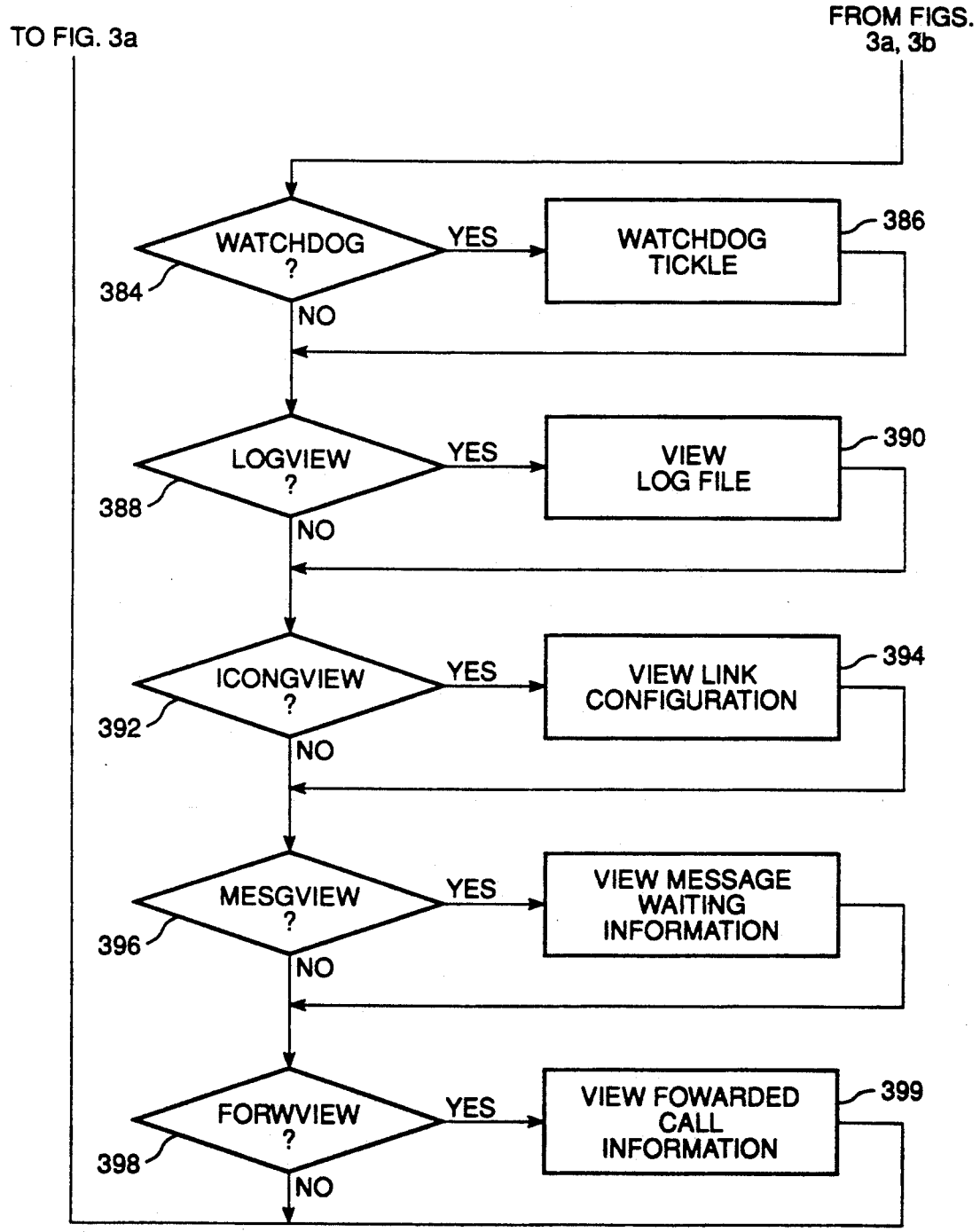

Once the set command step is completed affirmatively, the command is then executed according to an appropriate subroutine, as selected from those in FIG. 3b. Once the subroutine is completed, the loop continues to the watchdog routine. There are 26 available subroutines that include the following: SMDI translate (step 328) which performs the user extension to mailbox translation in accordance with the call forwarding reason as indicated by the central office in the SMDI data packet for presentation to the voice messaging system. Voice messaging translate (step 330) which performs the mailbox number to user extension translation(s) in accordance with the function specified by the voice messaging system SMDI data packet for presentation to the central office. Set link definition (step 332) for adding a unique translation entry to the translation database for specification of the correct line to be answered by the voice messaging system. Clear link definition (step 334) that removes a unique translation entry from the translation database which has been previously added in step 332. Forwarded call information program (step 336) that adds a unique translation entry to a translation database to specify a mailbox number (based on the forward call reason as indicated in the SMDI data packet from the central office to present to the voice messaging system) which will answer the incoming call. Set message waiting (step 338) that adds a unique translation database to specify the extension number(s) which are to be affected by an SMDI data packet sent from the voice messaging system. Clear message waiting (step 340) that removes a unique translation from the translation database previously entered in step 338. View link information (step 342) which displays the SMDI data packets to and from the central office and vice messaging system in real time and is used for the purpose of test and analysis. View link configuration (step 344) for displaying the link (physical line) translations which have been loaded into the translation database and is used for the purpose of test and analysis. View message waiting (step 346) that displays the message waiting translations which have been loaded into the translation database and is used for the purpose of test and analysis. View forwarded call information (step 348) displays the forward call reason/user extension/answering mailbox number translations which have been loaded into the translation database and is used for the purpose of test and analysis. Reload translation tables (step 350) causes all modifications to the translation databases to be loaded into active memory for use by the operating software. Reboot (step 352) causes the system to halt all operation and subsequently reset, after which, normal operation resumes. Watchdog enable (step 354) enables the watchdog timer function after a watchdog timer disable has been performed. Watchdog disable (step 356) disables the watchdog timer function and is used for the purpose of test. Software license check (step 358) performs a test to ensure the serial number of the software loaded on the system and the license expiration date for that copy of the software are correct. A system shutdown will result if these tests are not passed. Shut down (step 360) performs an orderly cessation of system operations and then halts all system operation. Buffer check (step 362) checks for the existence of a complete SMDI data packet from the central office or voice messaging system within the buffer for that data link. This routine also checks for the existence of a completed system command in the console buffer. SMDI retry (step 364) causes an SMDI data packet destined for a central office to be resent if the central office indicates that a previous attempt to send that packet failed. View log file (step 366) displays the system error log file in chronological order and is used for the purpose of test and analysis. Print (step 368) causes all data normally displayed on the system console terminal to be routed to a printer device connected to the printer port on the system. Remove forwarded call information (step 370) removes a unique translation from the translation database previously entered in step 336. Reset message waiting (step 372) resets (turns off) all message waiting indications on extensions listed in the translation database regardless of their current state and is used during installation. Clear log file (step 374) removes all entries currently in the error log file and places a message at the beginning of the new error log file indicating the date and time the log file clear function was performed. Enable message waiting (step 376) enables (turns on) message waiting indication for the specified extension by sending the appropriate SMDI data packet to the central office and is used during installation and for the purpose of test and analysis. Disable message waiting (step 378) disables (turns off) message waiting indication for the specified extension by sending the appropriate SMDI data packet to the central office and is used during installation and for the purpose of test and analysis. Other command include set alarm (step 380) and reset alarm (step 382).

Operation of watchdog subroutine, FIG. 3c, goes as follows: First, the system assumes that the watchdog routine is active (step 384). If yes, the watchdog routine performs a watchdog tickle (step 386) and then asks whether to logview (step P). If no (or after step 386), the routine proceeds to step 388 which determines if a log file view is requested. If step 388 is yes, the routine then views the log file (step 390). After which, or if step 388 is no, the routine decides whether to view the link configuration (step 392). If yes, the log configuration is viewed (step 394). Afterwards, or if step 392 is no, it is determined whether to view the message waiting information (step 396). After viewing the message waiting information, the system views the forwarded call information (step 399), if any (step 398). The loop then returns to select the next port in FIG. 3a.

PC Card

Figure 2A:
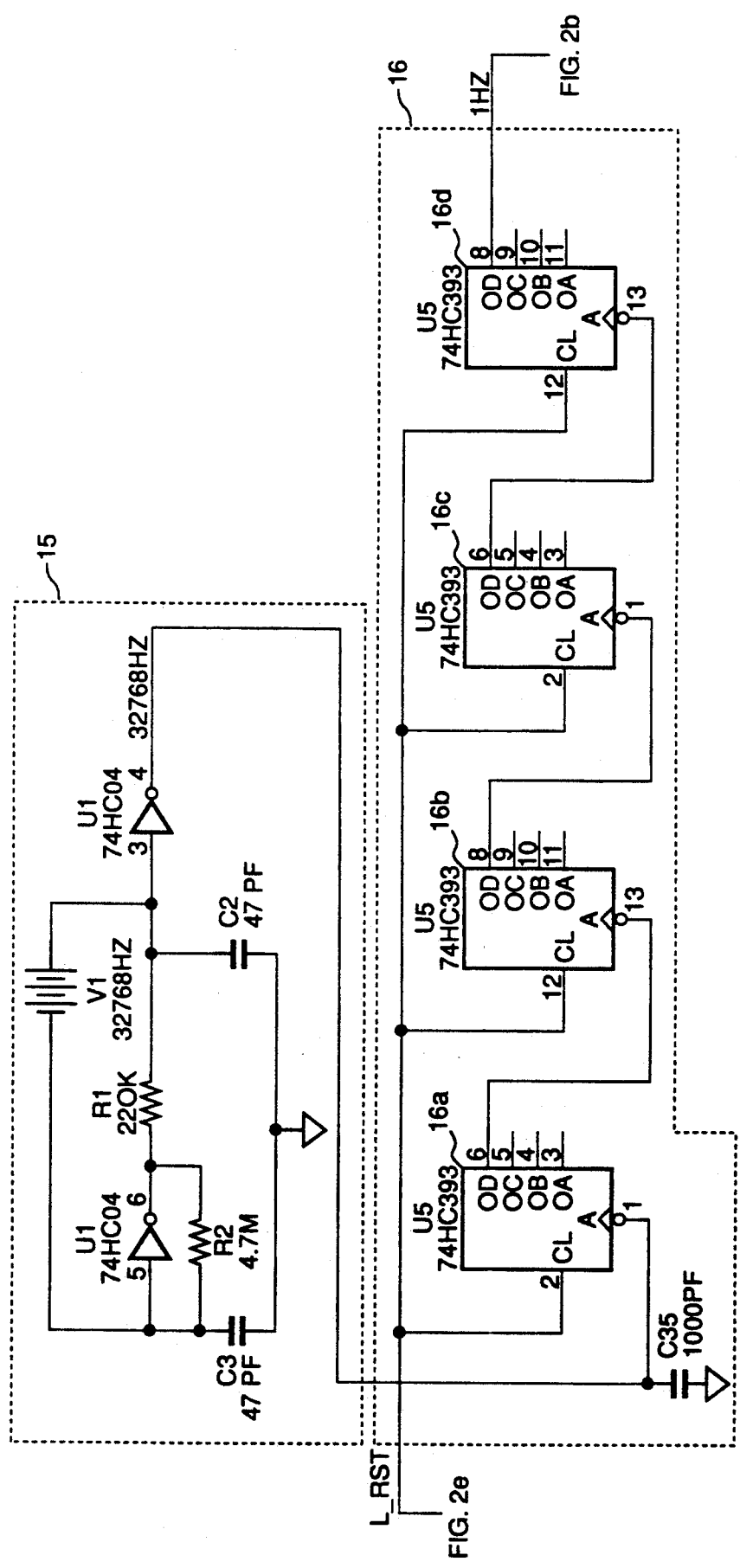
FIGS 2a to 2j illustrate the PC card disclosed herein and, specifically.
Figure 2A:
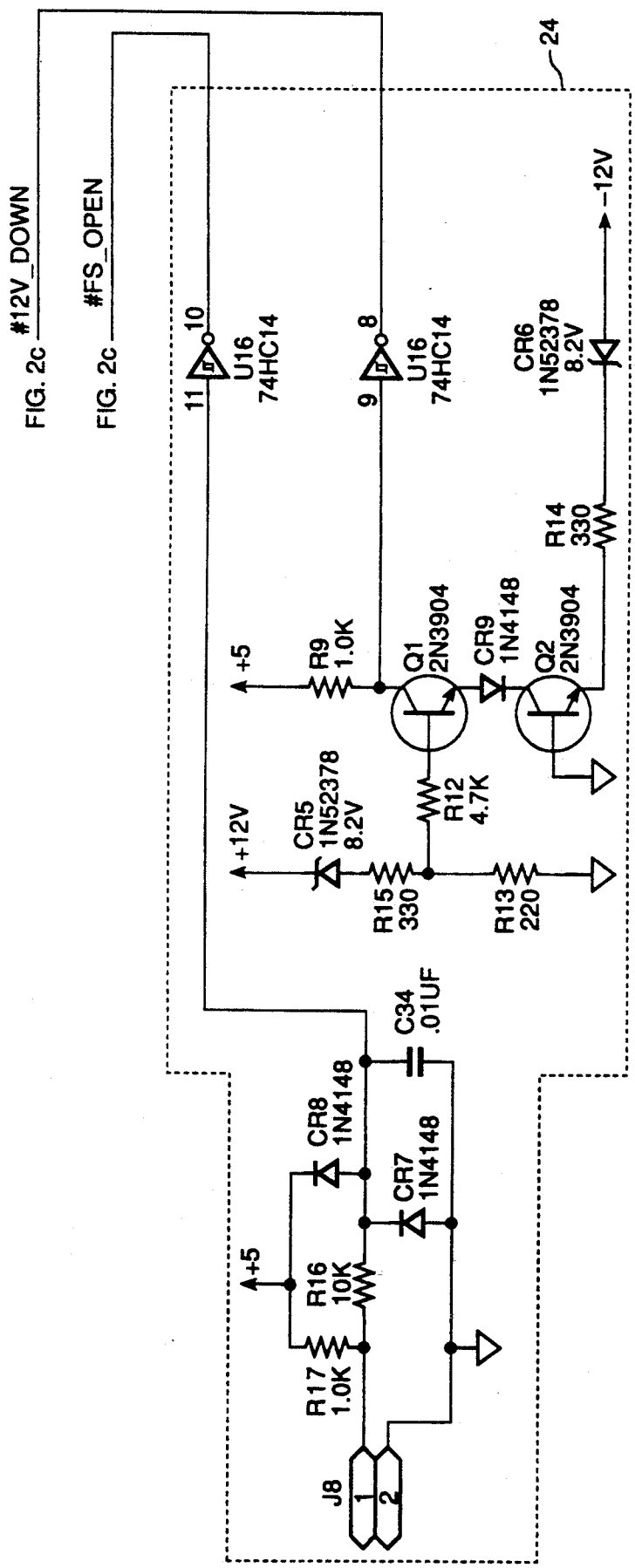

FIGS. 2a to 2j illustrate the PC card disclosed herein. In particular, FIG. 2a illustrates the time base generator utilized in the SMDI processor. The time base generator includes a clock circuit 15 which is used to generate a signal "32768HZ," which is fed to counter circuit 16. Counter circuit 16 includes programmable countdown dividers 16a, 16b, 16c, and 16d which divide the 32768 Hz signal by 16, 16, 16, and 8, respectively, to produce a 1 Hz signal, "1HZ."

Figure 2B:
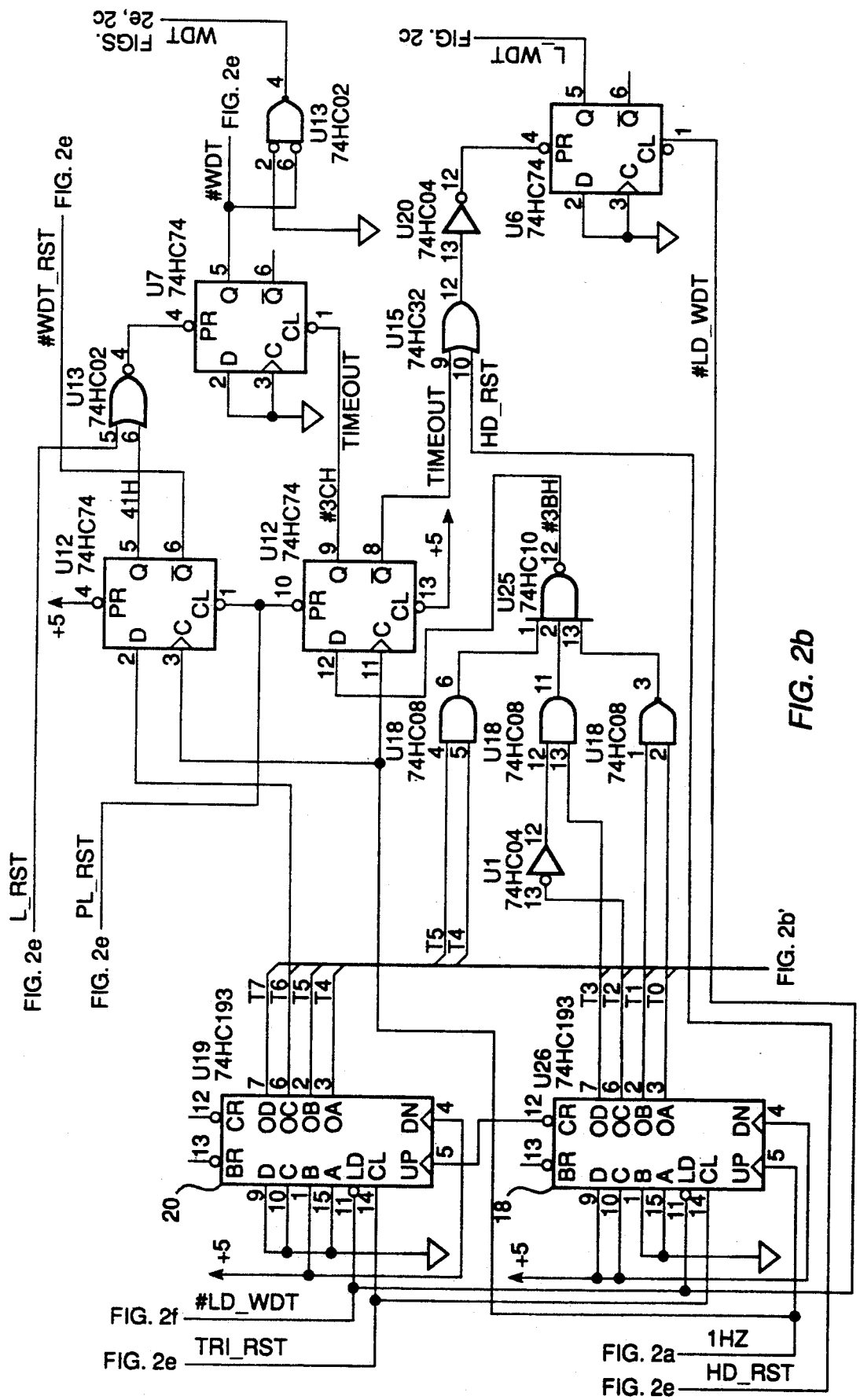

Referring to FIG. 2b, the signal 1HZ is then used to detect failures in the PC system/software. Specifically, if the AT computer does not provide a signal "*LD_WDT" every 30 seconds, a signal "WDT" goes high. In FIG. 2e, the signal WDT in turn produces a signal "*MB_RST" which, ultimately, produces a signal "MBB_RST" in FIG. 2f. MBB_RST is provided as a motherboard reset to the AT computer. Motherboard reset may also be provided with a reset switch 22.

Regardless of how the motherboard reset is initiated, a signal "L_RST" resets the counters 16a to 16d. As seen in FIG. 2e, the signal "*WDT" (produced simultaneously with WDT) is delayed 5 seconds after motherboard reset, and ultimately produces the delayed signal L_RST. L_RST resets counters 16a to 16d to restart the process of monitoring the PC computer. Similarly, L_RST makes *WDT reset the signal WDT and, hence, *MB_RST.

FIG. 2a also illustrates a 12-volt power monitoring system 24. In the event that a failure of the 12-volt power supply occurs, a signal "*12V_DOWN" is produced. As discussed below, *12V_DOWN is one of the sources for an alarm signal in the alarm system.

Figure 2C:
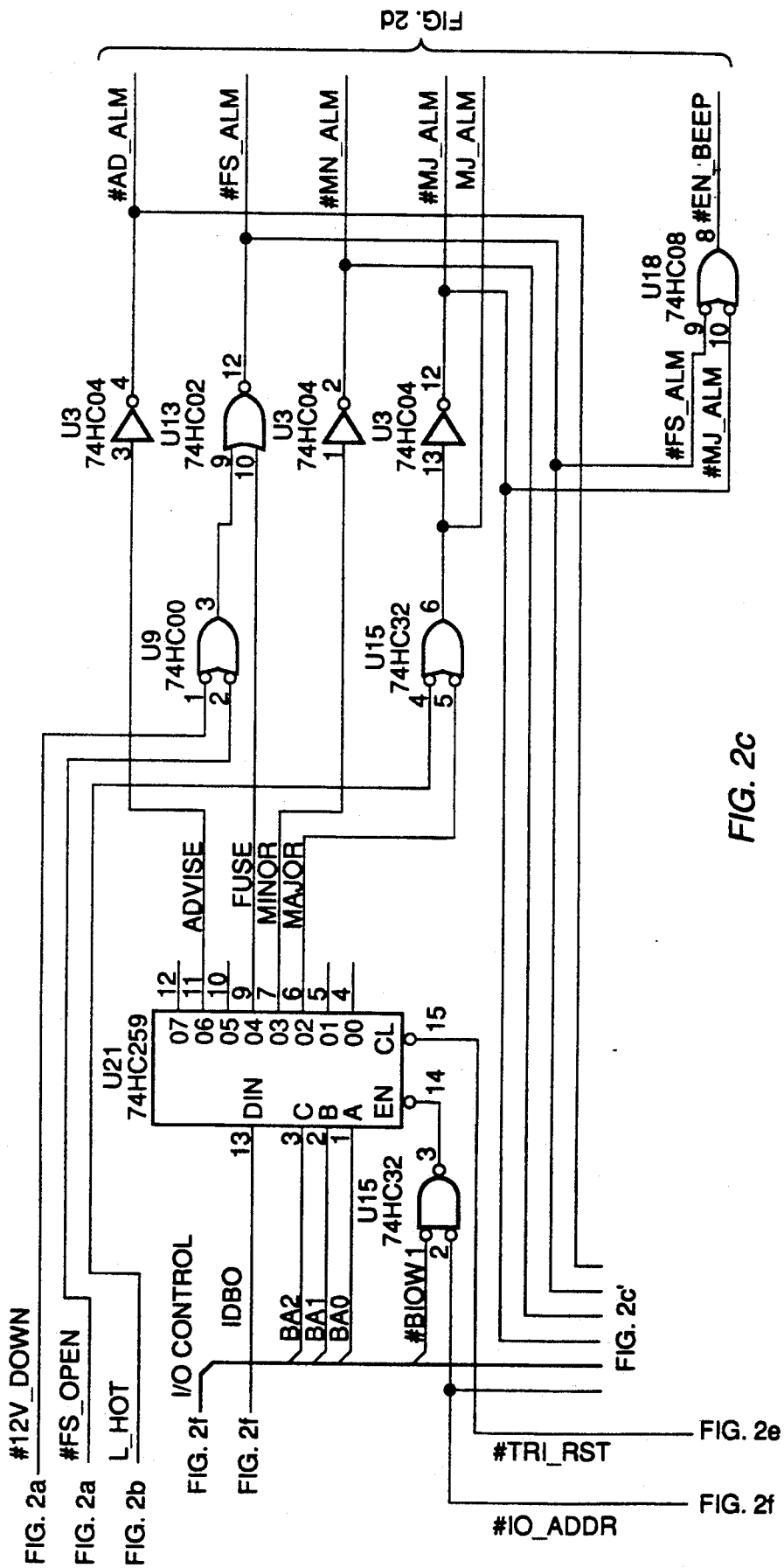
Figure 2D:
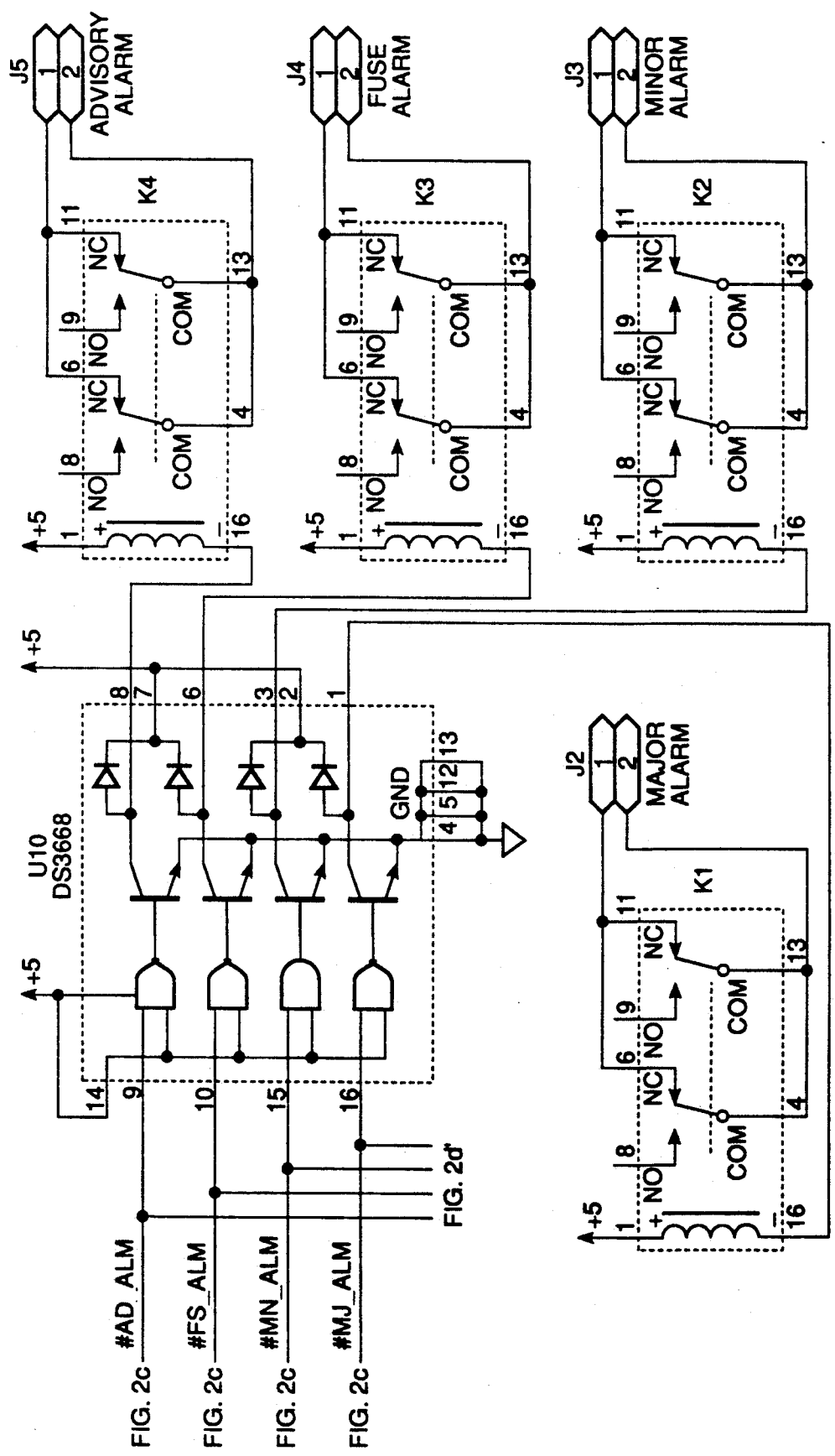
Figure 2E:
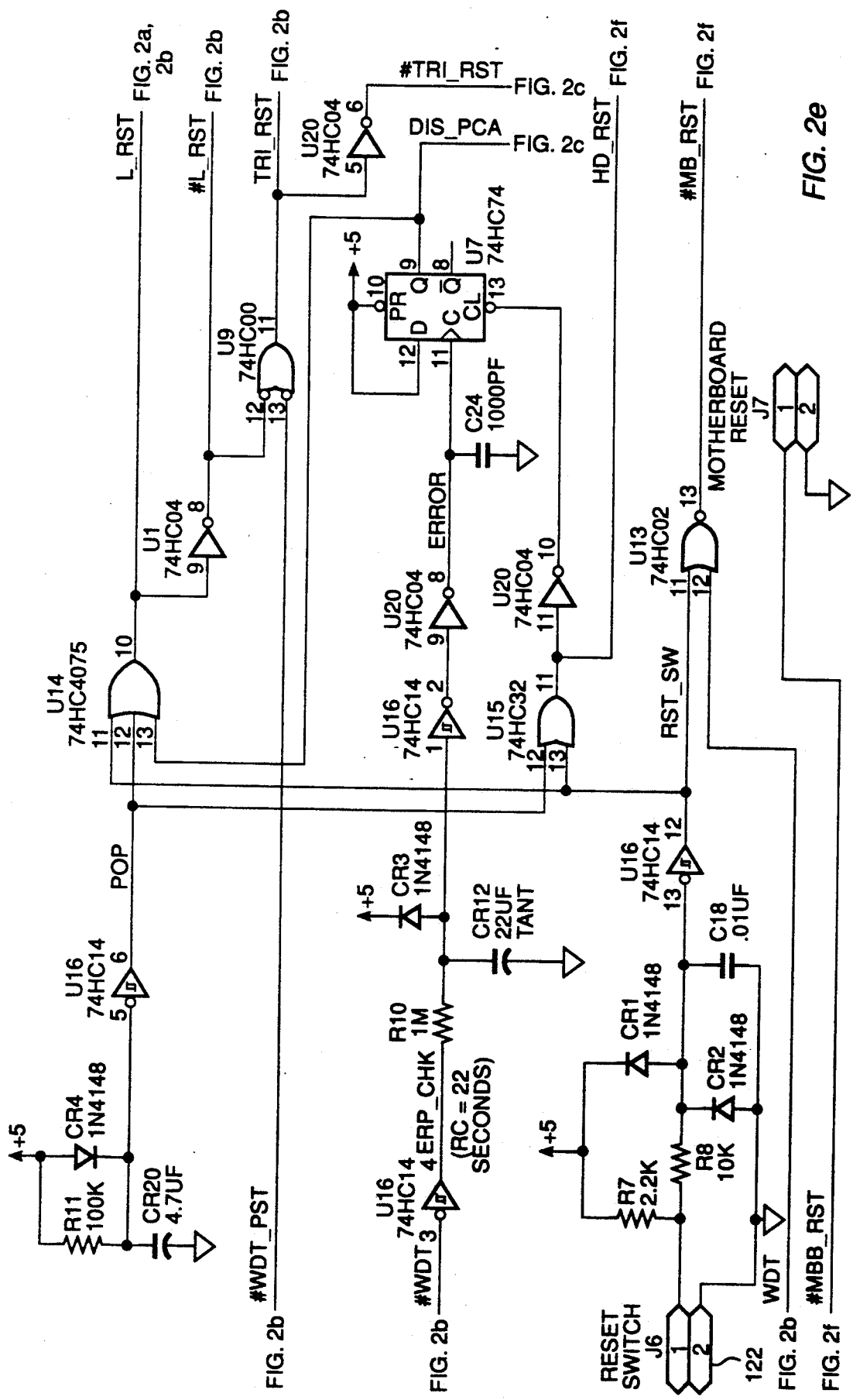
Figure 2F:
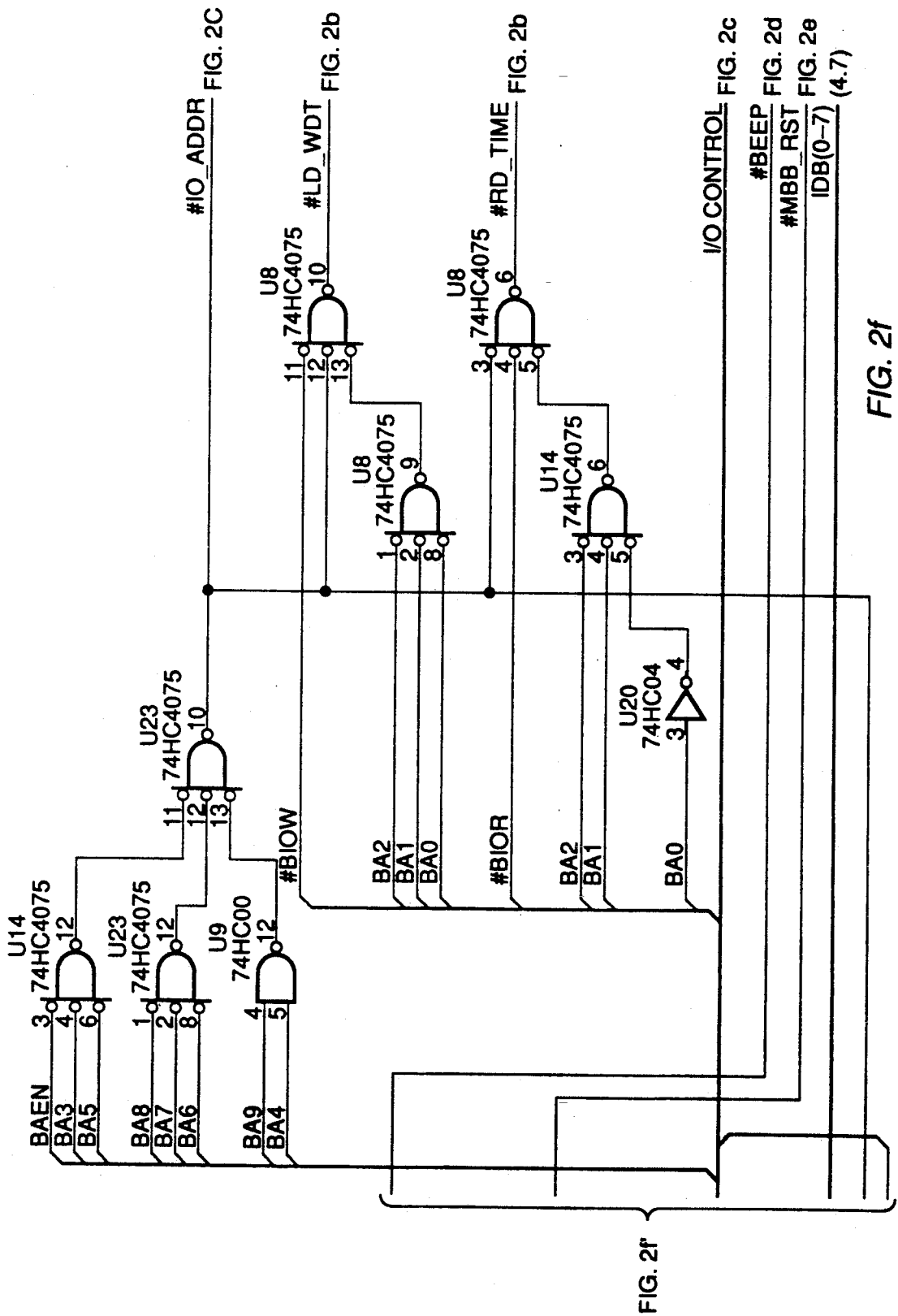
Figure 2F:
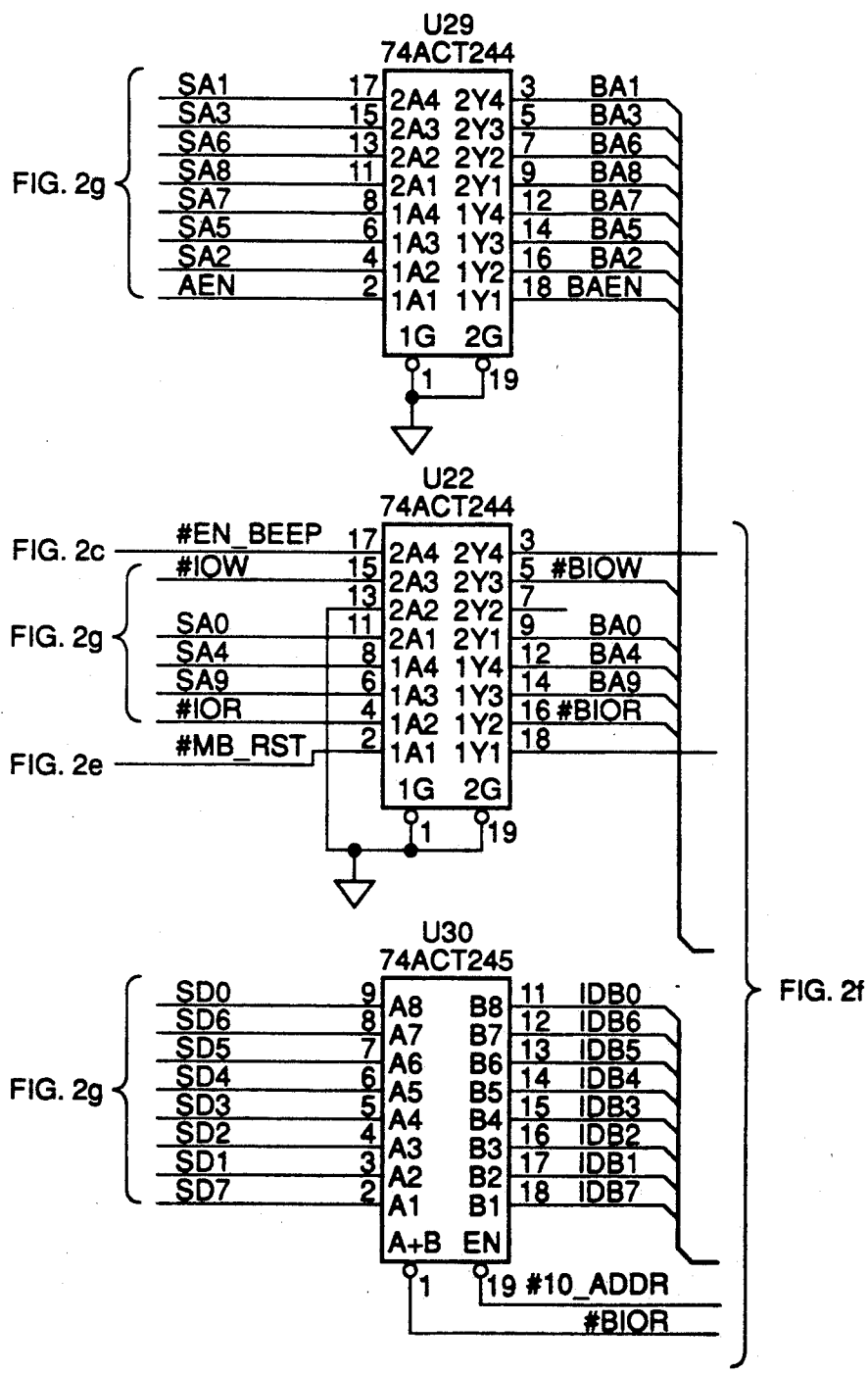
Figure 2G:
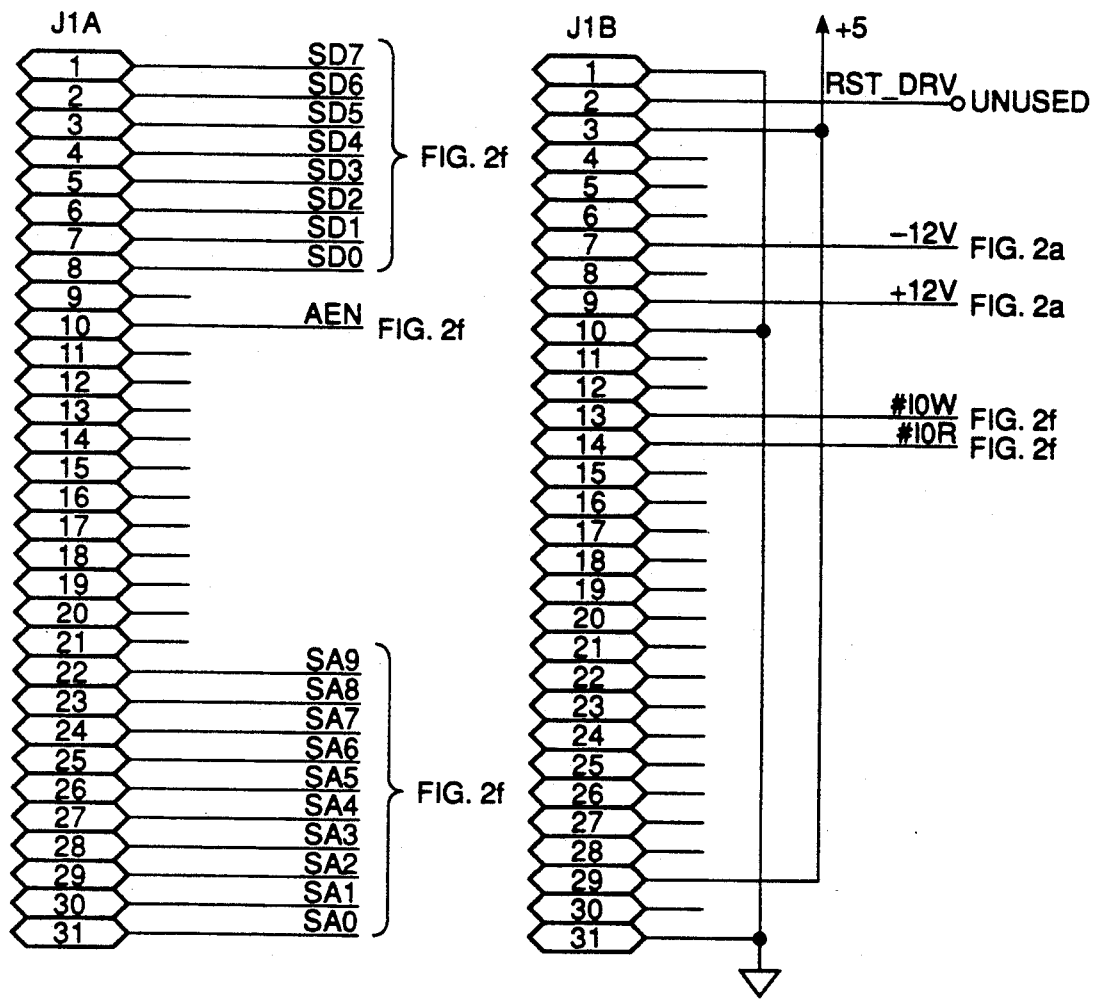
Figure 2H:
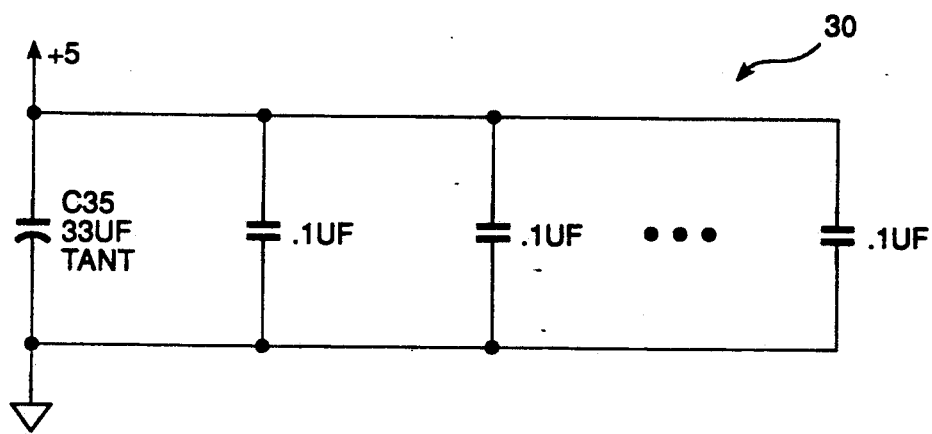
Figure 2I:
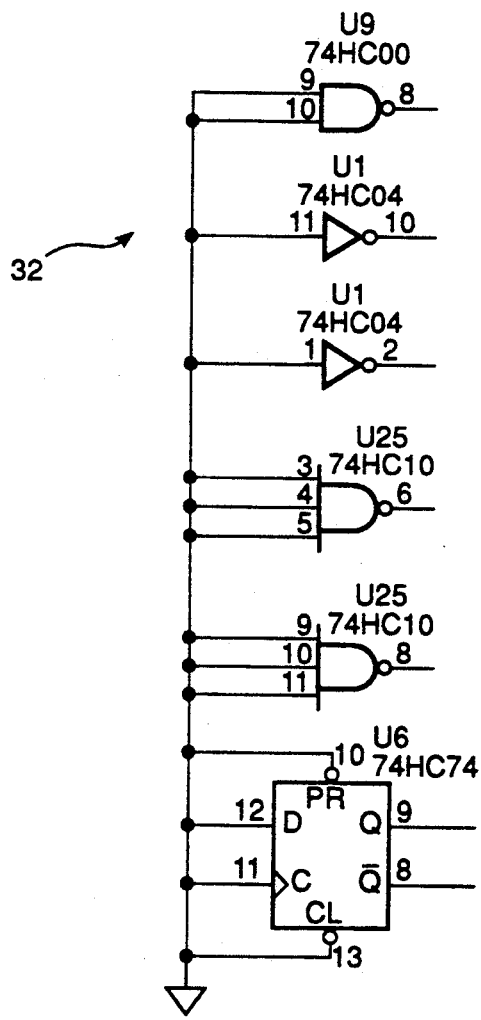
Figure 2J:
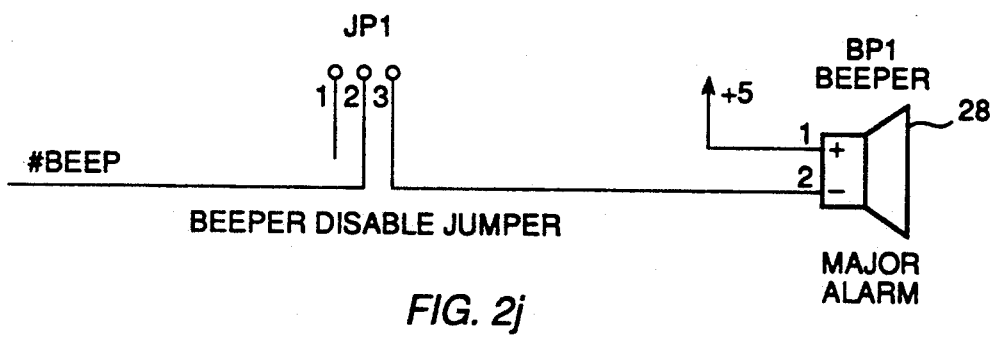

FIGS. 2c, 2d and 2j illustrate the alarm control and alarm system. The alarm system provides four levels of alarm, i.e., "major," "minor," "fuse," and "advisory." The major alarm indicates a failure that immediately impacts service. As shown in FIG. 2e, the signals "*MJ_ALM" and "MJ_ALM" are initiated by failures in the software/PC computer which initiate the signal L_WDT. The signals *MJ_ALM and MJ_ALM illuminate LED 26, activate beeper 28 (via the signals "*EN_BEEP" and "*BEEP") and provide an indication of the alarm on the display console. These signals also provide contact closure for external indication of alarm condition.

Minor alarms are initiated via a variety of failures detected by the system software including a data base failure, and the like. The signal "*MN_ALM" does not initiate the beeper 28, but does illuminate LED 26 and provide an appropriate indication on the console. Contact closure for external indication of the alarm condition is also provided.

Fuse alarms are initiated via the signal "*12V_DOWN," or "FS_OPEN" and indicate a failure of the 12-volt power supply or an open fuse. Again, indications are provided on the console and LED 26 and contact closure for external indication of the alarm condition is provided.

Advisory alarms indicate a problem that requires attention, but will not immediately impact service, and are also initiated by the system software. Advisory alarms occur when an invalid command is made from the console, when a telephone number is entered for which there is no translation, or the like. Contact closure for external indication of the alarm condition is also provided.

FIGS. 2f and 2g illustrate the input/output interface and the input/output channel. FIG. 2i also shows bypass capacitors 30, which reduce noise from the +5-volt power. Spare gates 32 are also provided, as shown in FIG. 2h.

It is to be understood that the above description is intended to be illustrative and not restrictive. The scope of the invention should, therefore, be determined not with reference to the above description but should, instead, be determined with reference to the appended claims along with their full scope of equivalents.

What is claimed is:

1. Message interface apparatus comprising:
    a) a plurality of simplified message desk interfaces (SMDIs), said SMDIs providing at least one messaging service;
    b) voice messaging means; and
    c) means for providing voice messaging service from said voice messaging means to each of said simplified message desk interfaces, said voice messaging service means comprising an adjunct SMDI processor, said adjunct SMDI processor performing at least a step of performing a user extension to mailbox translation based upon all forwarding data in an SMDI data packet.

2. Apparatus as recited in claim 1 further comprising means for answering a plurality of telephone lines in a single mailbox.

3. Apparatus as recited in claim 1 further comprising means for activating a stutter dial tone on a plurality of telephone lines from any of said voice messaging service means.

4. Apparatus as recited in claim 1 further comprising means for activating a stuttered dial tone on a plurality of phone lines, said stuttered dial tone activated in response to a signal from a single mailbox.

5. Apparatus as recited in claim 1, wherein said means for providing voice messaging service further comprises an appropriately programmed digital computer.

6. Apparatus as recited in claim 5 further comprising data links, said data links for interconnecting said digital computer with said voice messaging means and with said SMDIs; and
    alarm means, said alarm means indicating a failure in said data links from said SMDI processor.

7. Apparatus as recited in claim 6, wherein said alarm means further comprises a clock means and means for inputting a periodic signal, wherein said alarm means is activated after a pre-determined number of pulses from said clock means in the absence of said periodic signal.

8. A method of providing voice messaging interface service comprising the steps of:
    a) providing connections for a plurality of central office facilities to a simplified message desk interface (SMDI) processor, said central office facilities providing at least one voice messaging service;
    b) providing said at least one voice messaging service from each of said central office facilities to a plurality of voice messaging computer means; and
    c) answering a plurality of telephone lines in a single mailbox.

9. The method as recited in claim 8 further comprising the step of activating a stutter dial tone on a plurality of telephone lines in a plurality of central office facilities.

10. A method of providing voice messaging interface service comprising the steps of:
    a) providing connections for a plurality of central office facilities to a simplified message desk interface (SMDI) processor, said central office facilities providing at least one voice messaging service;
    b) providing said at least one voice messaging service from each of said central office facilities to a plurality of voice messaging computer means; and
    c) selecting a first mailbox for activation in response to a first reason for entry to the voice messaging interface service, a second mailbox in response to a second reason for entry to the voice messaging interface service, and a third mailbox in response to a third reason for entry to the voice messaging interface service.

11. A method of providing voice messaging interface service in a digital computer programmed to produce a periodic pulse, said computer further comprising a clock means adapted to indicate an alarm if said pulse is not received by said clock means after a pre-determined period, said method comprising the steps of:
    a) providing connections for a plurality of central office facilities to a simplified message desk interface (SMDI) processor, said central office facilities providing at least one voice messaging service; and
    b) providing said at least one voice messaging service from each of said central office facilities to a plurality of voice messaging computer means.

* * * * *